(12) United States Patent
Rutley et al.

(10) Patent No.: US 10,666,424 B1
(45) Date of Patent: *May 26, 2020

(54) SYSTEMS AND METHODS FOR TRIGGER BASED SYNCHRONIZED UPDATES IN A DISTRIBUTED RECORDS ENVIRONMENT

(71) Applicant: MASSACHUSETTS MUTUAL LIFE INSURANCE COMPANY, Springfield, MA (US)

(72) Inventors: Jennifer Rutley, Springfield, MA (US); Abigail Jennings O'Malley, Brighton, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 191 days.

This patent is subject to a terminal disclaimer.

(21) Appl. No.: 15/789,429

(22) Filed: Oct. 20, 2017

Related U.S. Application Data

(60) Provisional application No. 62/410,710, filed on Oct. 20, 2016.

(51) Int. Cl.
| | |
|---|---|
| *H04L 9/32* | (2006.01) |
| *H04L 9/06* | (2006.01) |
| *G06F 11/34* | (2006.01) |
| *H04L 29/06* | (2006.01) |
| *G06F 16/23* | (2019.01) |

(52) U.S. Cl.
CPC ........ *H04L 9/0637* (2013.01); *G06F 11/3476* (2013.01); *G06F 16/23* (2019.01); *H04L 63/1416* (2013.01)

(58) Field of Classification Search
CPC ... H04L 9/0637; H04L 63/1416; G06F 16/23; G06F 11/3476
See application file for complete search history.

(56) References Cited

U.S. PATENT DOCUMENTS

| | | | |
|---|---|---|---|
| 2015/0206106 A1* | 7/2015 | Yago | G06Q 20/0658 |
| | | | 705/68 |
| 2017/0046664 A1* | 2/2017 | Haldenby | G06Q 20/0655 |
| 2017/0124556 A1* | 5/2017 | Seger, II | G06Q 20/3829 |
| 2017/0331896 A1* | 11/2017 | Holloway | H04L 67/12 |
| 2018/0062848 A1* | 3/2018 | Gorman | H04L 9/3247 |

* cited by examiner

*Primary Examiner* — Baotran N To
(74) *Attorney, Agent, or Firm* — Foley & Lardner LLP

(57) ABSTRACT

A computerized system and method may include, in response to receiving a blockchain via a communications network that includes information associated with an event, parsing, by a blockchain parsing engine being executed by a blockchain node, the information to identify a status state of an item related to the event. The blockchain may be inclusive of the information along with the status state of the item may be stored in a storage unit. An event tracking engine may determine from the parsed information that the status state of the item transitioned from a first state to a second state. Responsive to the event tracking engine determining that a qualifying state is satisfied by the item being in the second state, automatically executing, by the blockchain node, a smart code inclusive of initiating communications between a first party and a second party.

20 Claims, 5 Drawing Sheets

SYSTEMS AND METHODS FOR TRIGGER BASED SYNCHRONIZED UPDATES IN A DISTRIBUTED RECORDS ENVIRONMENT

CROSS-REFERENCE TO RELATED APPLICATIONS

This application claims priority to U.S. Provisional Patent Application Ser. No. 62/410,710, filed on Oct. 20, 2016, which is hereby incorporated by reference in its entirety.

BACKGROUND

Diverse types of computing systems (e.g. servers) and networks are maintained by different entities (or parties) for data storage and communication between various data storage hardware. For example, a first entity may maintain a single database; a second entity may maintain multiple databases; or the first and second entities may share a common database. One or more servers may push updates to various database records within the databases such that all the databases remain up to date. A system of real time updates is crucial to the databases and servers implementing real time transaction processing or any other type of secured process.

One of the challenges in maintaining multiple databases is data integrity and confidentiality. The integrity of the database and the updates being pushed within the network must not be compromised. Furthermore, the confidentiality of the database and updates should not be beached. This is especially challenging in a "mixed" update environment, wherein a portion of the update is confidential and another portion is not. The challenge is compounded when computing systems (for example, servers) maintained by multiple entities are generating and pushing the updates to the databases. In a multi-entity environment wherein various computing systems generates and push updates to various database, each computing system generating and pushing the update has to be authenticated. That is, the system has to ensure that a malicious party is not posing as the computing system to generate and push unauthorized updates.

Furthermore, within a real time processing system, one or more computing systems have to automatically and intelligently generate updates to one or more databases in response to one or more event. As indicated before, the system has to ensure the integrity of the computing systems generating the updates, the security and integrity of the updates themselves, and the security and integrity of the databases receiving the updates.

SUMMARY

What is therefore needed are computer systems and methods that generate and push updates to database records in one or more databases in response to one or more trigger conditions while maintaining the security and integrity of the updates and the databases.

In one embodiment, computerized method comprises: in response to receiving a blockchain by a blockchain node via a communications network including information associated with an event, parsing, by a blockchain parsing engine being executed by the blockchain node, the information associated with the event to identify a status state of an item related to the event; determining, by an event tracking engine being executed by the blockchain node, from the parsed information that the status state of the item has transitioned from a first state to a second state; responsive to the event tracking engine being executed by the blockchain node determining that a qualifying state is satisfied by the transitioned status state of the item: identifying, by the blockchain node, based upon the information associated with the event, an electronic certificate associated with the item and stored by the blockchain, wherein the electronic certificate verifies the status state of the item; parsing, by the blockchain parsing engine being executed by the blockchain node, the electronic certificate to retrieve a unique identifier of a third-party event verifying computing system; and executing, by the blockchain node, a smart code inclusive of initiating communications between a first party and a second party at an address of the second party in response to authenticating the third-party event verifying computing system based on the retrieved unique identifier.

In another embodiment, a computer system comprises: a blockchain node comprising: a blockchain engine configured to receive a blockchain that includes information associated with an event; a blockchain parsing engine configured to identify a status state of an item related to the event based upon paring the information associated with the event; an event tracking engine configured to determine from the parsed information that the status state of the item has transitioned from a first state to a second state; and wherein responsive to the event tracking engine determining that a qualifying state is satisfied by the transitioned status state of the item: the blockchain node is configured to identify, based upon the information associated with the event, an electronic certificate associated with the item and stored by the blockchain, wherein the electronic certificate verifies the status state of the item, the blockchain parsing engine is further configured to parse the electronic certificate to retrieve a unique identifier of a third-party event verifying computing system, the blockchain node is further configured to execute a smart code inclusive of initiating communications between a first party and a second party at an address of the second party in response to authenticating the third-party event verifying computing system based on the retrieved unique identifier.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
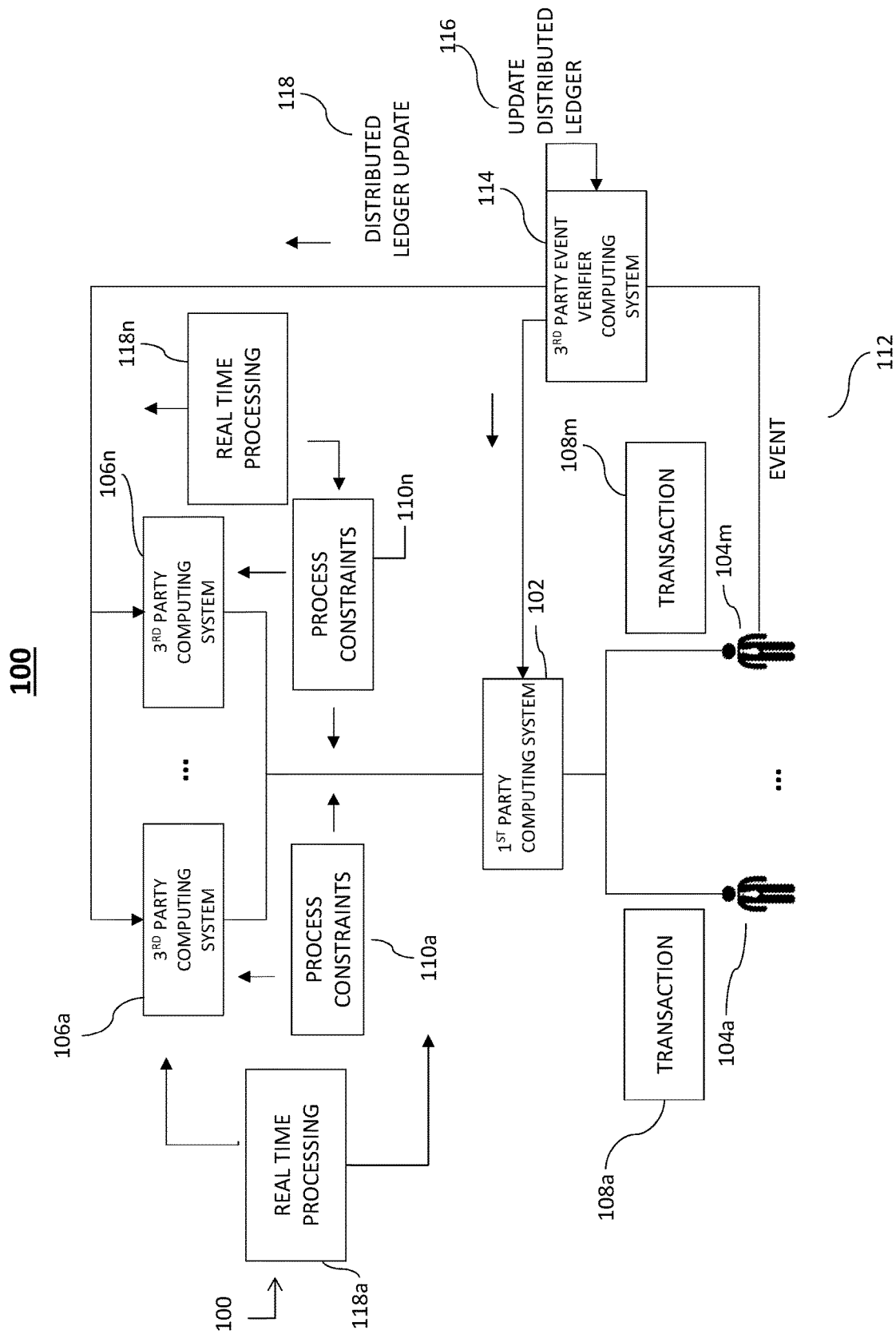
FIG. 1 shows an exemplary system, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

With regard to FIG. 1, an illustration of an exemplary system 100 in which a first party computing system 102 may process transactions with individual customers 104a-104m (collectively 104). For example, the first party computing system 102 may be maintained by an insurance company that sells insurance policies wherein the individual customers 104a-104m may be policyholders. Furthermore, the first party computing system 102 may communicate with third party computing systems 106a-106n (collectively 106) for processing one or more transactions. For example, the third party computing systems 106a-106n may be maintained by third-parties or secondary buyers who may purchase portions of the insurance policies sold by the insurance company to the individual customers 104a-104m.

Transaction processing by the third party computing systems 106 may be based upon the respective process constraints 110a-110n. For example, the first party (i.e. the insurance company) and the third party may have contractual relationships that provide for certain contractually bound obligations and the respective process constraints 110a-110n may be based upon those obligations. The transactions 108a-108m (collectively 108) between the first part computing system 102 and the individual customers 104 may be in the form of insurance policies, which may be personal (e.g., life insurance, health insurance, disability insurance, home insurance, etc.) or commercial insurance policies (e.g., D&O insurance, fire insurance, worker liability insurance, etc.). The system 100 may maintain a distributed database to store the transactions between the first party computing system 102, the individual customers 104, and/or the third party computing systems 106 as a hash-linked distributed ledger. A non-limiting example of the hash-linked distributed ledger may be a blockchain.

In an embodiment, the system 100 may allow the customers 104 to set permissions for the first party computing system 102 to enable the third party computing systems 106 to have access to the data blocks of the customers 104. In some embodiments, the data blocks may be stored within a private or a public blockchain. In an insurance context, information submitted with claims to collect on the insurance policies may be sensitive to the customers 104 and/or heirs of the customers 104, and communications of the information may need to be protected for a variety of reasons. The process constraints 110a-110n (collectively 110) between the first party computing system 102 and third-party computing systems 106 may be configured so that an event that occurs in the future that is related to the event will cause a transaction to occur between the first party computing system 102 and third-party computing systems 106.

In an aspect, in response to an event 112 occurring, a third-party event verifier computing system 114 may independently verify the event 112 so as to create an official and verifiable digital record of the occurrence of the event 112. In the case of the transaction 108a, for example, being a life insurance, and the event 112 being a death of the customer 104a, the third-party event verifier computing system 114, such a hospital or a funeral home server may certify that the customer 104a has, in fact, died (i.e., an event that may trigger a claimable event). For example, the third party event verifier computing system 114 may access a hash-linked di ledger from and link a block to the hash-linked distributed ledger, wherein the block contains the one or more database records indicating the occurred event. For instance, for the case of the Customer 104a dying, the third-party event verifier computing system 114 may verify the event 112 and generate information, such as a digital (or electronic) death certificate compliant with applicable laws and regulations, that certifies that the event occurred. The verification of the event by the third-party event verifier computing system 114 may cause a status state of a customer 104 to transition from a first status state to a second status state, where the second status state may satisfy a qualifying state for a claim process to be initiated. The digital death certificate and/or information contained therein may be used to update or load payload into the hash linked distributed ledger at step 116.

In order to access the distributed ledger, the third-party event verifier computing system 114 may use a public and private encryption key that ensures that the verifier computing system 114 can access a previous transaction or state of the distributed ledger. By enabling access to the previous transaction or state of the distributed ledger, access to the information in the distributed ledger is proven, thereby ensuring limited access to the information (i.e., unauthorized third-parties have limited or no access to the information). The information stored in the blockchain implementing the digital may be encrypted. And, because the information may be loaded by a trusted third-party (i.e., the third-party event verifier computing system 114) with an encryption key, for example, that enables loading of the specific status state and/or event information, the information received and processed distributed ledger may be self-authenticating, such as is the case with a registered notary public. In one embodiment, loading event information may be sufficient for the status state to be altered (e.g., a digital death certificate being indicative that the customer's status has transitioned from being alive to being deceased). It should be understood that a wide variety of status state indicators may be utilized.

As further shown in FIG. 1, the third party event verifier computing system 114 may communicate an update to the distributed ledger, at step 118, to the first party computing system 102 and/or third the third party computing systems 106. As an example, step 118 may represent a real-time transaction processing between the first party computing system 102 with the third party computing system 106a based on the process constraints 110a. In an alternative embodiment, the first party computing system 102 may process the update to the distributed ledger and communicate to the appropriate third party computing systems 106 (i.e., computing systems associated with third parties with which the respective insurance policy was sold as opposed to all of the third parties with which the insurance company conducts business). Responsive to the first party computing system 102 and third party computing systems 106 receiving an update to the distributed ledger, a smart contract or any other process configured to automatically execute one or more processes in response to the information being updated in the distributed ledger. As an example, in response to receiving information in the distributed ledger of the event 112 (e.g., status state, a digital death certificate that identifies the customer 103a, etc.), the third party computing systems 106 may be notified of the event 112. Moreover, by using the secure and trusted verifier computing system 114 distributed ledger communication, actions may be performed automatically. In the case of a transaction 108 that has a death beneficiary, the beneficiary may be a contact that has a contact address, either or both a physical address and electronic address (e.g., email address, telephone number, or other electronic address). Information that identifies the contact and contact address may be included in the distributed ledger such that when a policyholder dies, process that parses the blockchain may identify the contact information, including the address, and automatically process that information to initiate a communication with the identified contact.

In one embodiment, the system 100 may utilize a smart contract (alternatively smart code) associated with the distributed ledger to digitally represent one or more conditions and execution steps when the one or more conditions are met. The smart contracts, therefore, may be self-executing. Responsive to an event stored in the distributed ledger, the system 100 may execute a smart contract to respond to a status state of a policyholder, for example. In an embodiment, the system 100 may track an event of a policyholder (e.g., status state transitions from alive to dead), and execute the smart contract to perform a one or more transactions between the first party computing system 102 and third party computing systems 106. By using distributed ledgers, an insurance claim process, for example, may be self-contained in that communications may be initiated and processes performed independent of human interaction because an inherently trustless environment may be trusted. That is, if the information that is entered into a distributed ledger is ensured to be generated and pushed by a trusted party (e.g., a hospital etc.) as a result of having an encryption key, thereafter each of the computing systems 102, 104 can trust that the information being communicated is accurate and unalterable by way of the inherent security of distributed ledgers.

Responsive to the first party computing system 102 receiving a copy of the distributed ledger with information inclusive of a status of an item or a customer, the first party computing system 102 may perform a process to identify that a change in the status of the item (e.g., customer) protected by the insurance policy. The first party computing system 102 and the third party computing systems 106 may perform real time processing 118 based on the one or more process constraints 110. In an embodiment, the system 100 may store a smart contract in the distributed ledger or elsewhere that may automatically cause a real-time transaction processing to be performed.

Figure 2:
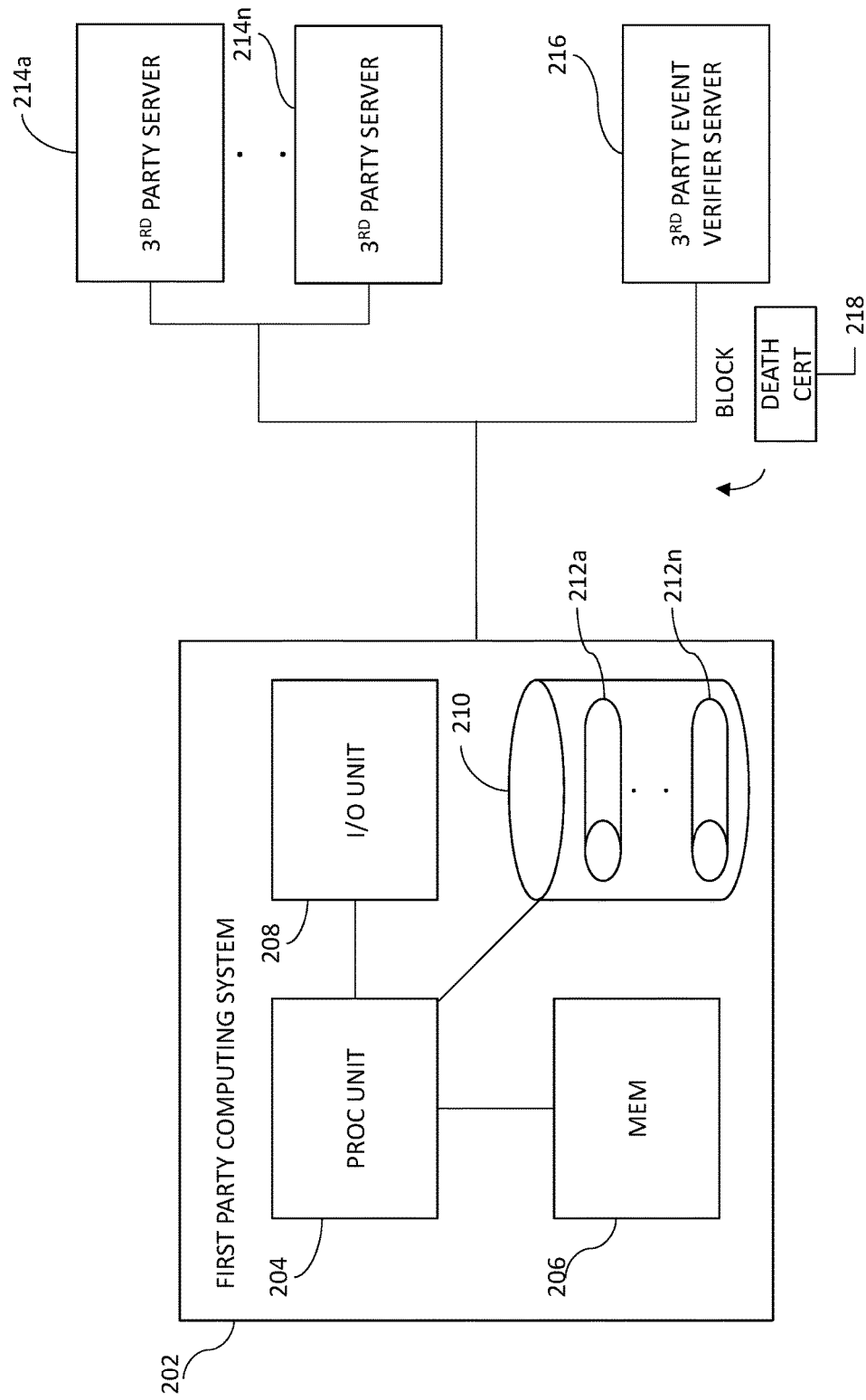
FIG. 2 shows an exemplary system, according to an exemplary embodiment.

FIG. 2 shows an exemplary system 200, according to an exemplary embodiment. The exemplary system 200 may include a first party computing system 202 and one or more third party servers 214. The first party computing system 202 may comprise processing unit 204 inclusive of one or more computer processors in communication with a memory 206, input/output (I/O) unit 208, and storage unit 210 configured to store and operate one or more data repositories 212a-212n (collectively 212). One having ordinary skill in the art appreciates that the system 200 and the components thereof are merely exemplary, and a system with substituted, additional, and subtracted components should be considered within the scope of this disclosure.

The first party computing system 202 may be a network node implementing a distributed ledger. For example, the first party computing system 202 may be a blockchain node. As a blockchain node, the computing system 202 may receive blockchains, read blockchains, and add information to a new block for inclusion in the blockchains, if authorized. The data repositories 212 may implement one or more distributed ledgers (blockchains) by storing a blockchain or one or more nodes of the blockchain. In operation, as the first party computing system 202 receives a block or a blockchain, the first party computing system 202 may parse the block or blockchain and add the parsed information to one of the data repositories 212. Furthermore, the first party computing system 202 may generate one or more blocks to be appended to the blockchain. In an embodiment, the first party computing system 202 may utilize encryption keys associated with the access and/or update the blockchain. The first party computing system 202 may verify or generate a status state in response to receiving the information in the blockchain.

As further shown, third party servers 214a-214n (collectively 214) communicate with the first party computing system 202 via a communications network, such as the Internet, for communicating information therebetween. The third party servers 214 may be associated with one or more third-parties that may purchase active insurance policies from the insurance company associated with the first party computing system 202. The information may be in the form of blockchains or other distributed ledger information sharing protocol such that distributed ledgers stored by the third party servers 214, in an embodiment, may be updated with the same or similar information stored by the data repositories 212. A third-party event verifier server 216 may access and update a distributed ledger (not shown). In an embodiment, the server 216 may communicate with an encryption key server (not shown) to authenticate third party event verifier or other use attempting to update or add information to the distributed ledger such as a blockchain. Because the third-party event verifier is a trusted source of information that may utilize an encryption key to update the distributed ledger to add the information (e.g., a digital death certificate), a block 218 that is associated with other blocks that form a blockchain may be communicated to and accepted by the first party computing system 202 and/or third party servers 214. Addresses of the third party servers 214 may be provided to the first party computing system 202 and stored in relation to smart contracts between the parties so that responsive to a blockchain being received with information that indicates a change in status of a policyholder, for example, communications between the insurance company and third party that has a contractual relationship with the insurance company can be notified and/or a smart contract may automatically be initiated.

The distributed ledgers of the first party computing system 202 and third party servers 214 may cause the information to be automatically added to the distributed ledgers and may be automatically processed by either or both the first party computing system 202 company and third party servers 214. In other words, little or no verification may be needed as a blockchain supports a trustless environment in a trustful manner. Moreover, as a result of using distributed ledgers and blockchains, security of the information being stored and communicated may be protected such that an insurance company may enable automatic processing of claims as a result of trusting the information stored in the distributed ledger such as a blockchain.

Figure 3:
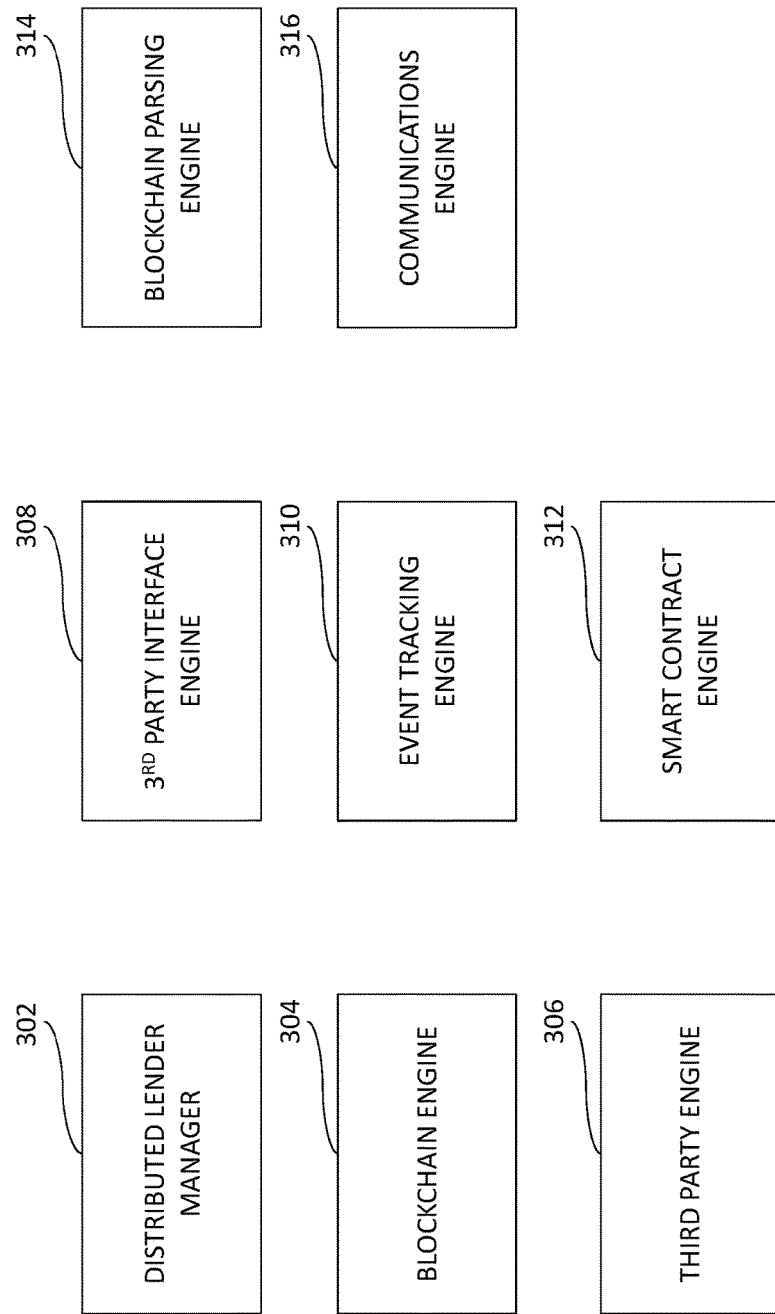
FIG. 3 a block diagram of an illustrative set of modules 300 for execution within the system shown in FIG. 2, according to an exemplary embodiment.

FIG. 3 shows a block diagram of an illustrative set of modules 300 for execution within the system 200. The modules 300 may include a distributed ledger manager 302 configured to manage a distributed ledger by receiving and verifying information to be stored in the distributed ledger. In an embodiment, the distributed ledger manager 302 may limit access to the distributed ledger to only users and/or computing systems with an encryption key. The distributed ledger manager 302 may be configured to communicate with other distributed ledger managers (not shown) in a network of distributed ledgers to provide for a consensus or other safeguards that ensure that data being added to or otherwise being altered in the distributed ledger is allowable.

A blockchain engine 304 may support blockchain operations and communications. The blockchain engine 304 may be configured to receive information, such as information of a claimable event (e.g., death certificate), and add the information to the latest blockchain for communication to other nodes on which the blockchain is stored. The blockchain engine 304 may be configured to receive or access the information to be added to a blockchain, and create or access a hash that associates the block with previous blocks of the blockchain. The blockchain engine 304 may limit access to the blockchain to anyone or any system without an encryption key. The block may be inclusive of the information and be communicated to other nodes to update their copies of the blockchain. In one embodiment, the communication may include an encryption key that limits the ability for the information to be accessed by anyone other than a participant in the distributed ledger. In an embodiment, a hash that ties to a block to a blockchain for a block including information to be added to the distributed ledger may be utilized and identified by the distributed ledger manager 302. In an embodiment, the blockchain may be protected using proof-of-work or other secure blockchain mechanism, as understood in the art. The distributed ledger manager 302 and/or the blockchain engine 304 may identify and confirm that a value of the proof-of-work exists and that a consensus has been made by miners performing hashing on the blockchain, as understood in the art.

A third party engine 306 may be configured to identify that the information being received via a blockchain is actionable for third parties that have purchased portions of insurance policy associated with information received via the blockchain or otherwise that is a claimable event. The third party engine 306 may be configured to be semi-automatic or automatic such that the third party engine 306 reduces processing time and ensures security of communications and information access with the insurance company.

A third-party event verifier interface engine 308 may interface with a computing system of a third-party event verifier. The third-party event verifier may be a trusted party and provide for information about an event, such as a death or other potential claim against an insurance policy. The third-party event verifier interface engine 308 may alternatively be integrated into the distributed ledger manager 302 or other module. In an embodiment, because the third-party event verifier may be provided with encryption key(s) to obtain access to the distributed ledger and/or blockchain, the third party engine 306 may be configured to identify a change to a status state and process an insurance claim, as further described herein.

An event tracking engine 310 may be configured to track events as the events are included in a distributed ledger such as a blockchain. The event tracking engine 310 may be configured to identify uniquely identifiable information associated with a policyholder of insurance policy associated with an insurance company that has sold a portion of the insurance policy to third party buyers. The event tracking engine 310 may be able to access metadata and/or information stored in the blockchain inclusive of information about the insurance policyholder. The information and/or metadata may include or be indicative of status state of the policyholder that may be used to improve efficiency of processing claims for the event. In an embodiment, the event tracking engine 310 may access the distributed ledger to identify specific identification information of policyholders of the insurance company so that upon receiving a blockchain inclusive of the information, the system may initiate communication with third parties via the third party engine 306 to semi-automatically or automatically begin a communication process to initiate settlement of an insurance claim (e.g., life insurance settlement).

A smart contract engine 312 may be a smart contract or may execute a smart contract. Smart contracts may be applications with a state stored in the blockchain, where the smart contracts may facilitate, verify, or enforce a negotiation or performance of a contract, or that may make a contractual clause unnecessary. In an embodiment, the smart contract may be stored in a memory, such as within or in association of a distributed ledger, of a computing system. Other smart contracts may be utilized by third parties with which an insurance company may negotiate in selling active insurance policies. In an alternative embodiment, the smart contract may reside on the blockchain such that when a state of a policyholder changes, the smart contract is accessed and executed. As an example, in the event of the policyholder dying, the smart contract may be activated by the smart contract engine 312 and terms of the smart contract executed. The terms may include terms that cause a notification and transaction to occur with a third party, such as a third party purchaser of an active insurance policy of the policyholder. In some embodiments, the smart contract may be public and each node of a blockchain may execute the smart contract. In an embodiment, the nodes of the blockchain for the active insurance policies may be limited to those parties that have an interest in the blockchain along with third parties that may be called upon to alter a status of the policyholder of the blockchain, although such third parties may not execute the smart contract as the third parties if no contractual arrangement within the smart contract extends to the third parties. Because smart contracts may be self-executing, the smart contract engine 312 may be software code embedded within a smart contract.

A blockchain parsing engine 314 may be executed on a computing system so as to parse information that is identified in blocks on a blockchain. The parsing engine 314 may decrypt encrypted information contained on the blockchain, if encryption is used to store the information in the blockchain. As a new or updated blockchain is received, the information that may be publicly or privately available on the blockchain may be read and parsed to determine specific information contained in the blockchain. The parsing engine 314 may identify a known set of parameters, including policyholder status as related to the specific type of policy that is active for a policyholder. As an example, if the policyholder has a life insurance policy, the status of the life of the policyholder may be a parameter for which the parsing engine 314 is configured to identify. Depending on the configuration, the parsing engine 314 may identify a death certificate in any format. As an example, the parsing engine 314 may identify a certificate or identifier of a third-party event verifier that certifies that authenticity and/or governmental authorization of the third-party event verifier. In an embodiment, the parsing engine may include an image processing engine, such as an image matching engine, that identifies a graphical image, such as a governmental stamp, such as a secretary of state stamp or letterhead of a funeral home, in a graphical image (e.g., pdf document of a death certificate) stored in a blockchain. The image processing engine may compare the identified graphical image with one or more images stored locally or in the blockchain to authenticate the identified graphical image.

In operation, the parsing engine 314, in parsing the information contained in the blockchain, may pass the information to another engine, such as the event tracking engine 310, that may determine that the policyholder satisfies a qualifying state for an insurance claim process identified in the insurance policy to be automatically initiated. In an embodiment, the smart contract engine 312 may initiated by the event tracking engine 310 to automatically execute one or more actions that are satisfied by the event (or lack of event depending on the terms of the contract). If the event satisfied a term of a contract between the insurance company and one or more third parties that have purchased an insurance policy of a policyholder associated with the event, the third party engine 306 may be engaged to automatically initiate communications with the third party. Alternatively, if the third party has a blockchain node, then the third party is notified by virtue of receiving the blockchain. It should be understood that the principles described herein may relate to items that are insured, have beneficiaries, or otherwise covered by a contractual obligation between two or more parties, which may include a reinsured party, where the items may include living (e.g., people, animals, organisms, etc.) or non-living items (e.g., houses, cars, intellectual property, etc.).

A communications engine 316 may be configured to automatically communicate with other systems and other parties, including third-part(ies) with which a first party, such as an insurance company, has a contractual relationship, beneficiaries, or any other party internally or externally from the insurance company. In an embodiment, responsive to the smart contract engine 312 or a smart contract being engaged to initiate a contractual provision, the smart contract engine 312 may engage the communications engine 316 to automatically initiate an electronic or other communication. In one embodiment, the communication may initiate payment in an electronic or other format.

Figure 4:
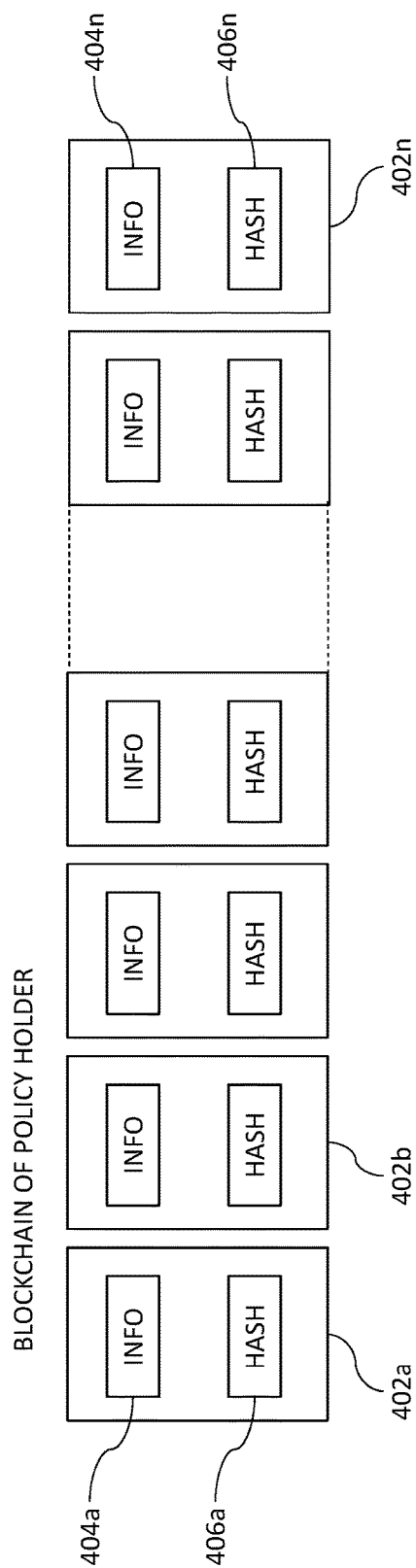
FIG. 4 is an illustration of a blockchain inclusive of blocks, according to an exemplary embodiment, that include information that enables information, such as event data and metadata associated with the event data to be stored.

With regards to FIG. 4, an illustration of a blockchain 400 inclusive of blocks 402a-402n (collectively 402) that include information 404a-404n (collectively 404) that enables information, such as event data, and metadata associated with the event data to be stored is shown. As previously described, the information may be the information added to the respective distributed ledgers, such as, for example, an event that is added to the distributed ledger by the third-party event verifier computing system 114 of FIG. 1. The information 404 may include information indicating or including status state of the respective customer or policyholder. Also contained in the blocks are hashes 406a-406n (collectively 406) that may link each of the blocks to the preceding blocks to form the blockchain 400. It should be understood that additional information, such as an identifier associated with users who added the information may be included in the blocks 402. As an example, if a coroner or funeral home created a death certificate that was added to the blockchain (e.g., data of the death certificate and/or image of the death certificate), an identifier associated with the user(s) who contributed to creating the death certificate may be included in the respective block. Such identification information may be a veracity scale factor that the information is true and accurate. Also not shown is a timestamp of the date and time that each of the blocks 402 is added to the blockchain 400.

During processing, prior to an end-block 402n is added to the blockchain 400, an authorized operator of the distributed ledger may utilize an encryption key to access and store the information therein. As the information itself is being stored in the blockchain 400, processes, such as actions that are triggered in response to receiving the information, may be performed. Because the information is entered by a trusted third-party due to having an encryption key to be able to enter the information into the distributed ledger and/or verifiable identifier being stored in association with the information, the information can be relied upon, thereby increasing security and reducing administration that is typically performed to collect, verify, and process the information associated with an event (e.g., death of a policyholder). As a result, efficiency to process a claim responsive to an event occurring is created.

To add efficiency to the beneficiary payout process, a private encryption key may be provided to the beneficiary for usage upon an event occurring that triggers a policy distribution situation. In an embodiment, the private encryption key may be used to authenticate the beneficiary. As an example, a user interface may provide for the beneficiary to submit a death certificate and his or her private key that enables (i) authentication of the beneficiary and (ii) access information that may be stored in the blockchain 400. A system may thereafter receive the death certificate and private key, compare the death certificate and private key that may be contained within the blockchain 400 of the insured, and determine that the beneficiary is authenticated upon determining that both the death certificate and private key matches. As a result, the inefficiencies of existing authentication processes prior to policy distribution to the beneficiary may be significantly reduced.

Figure 5:
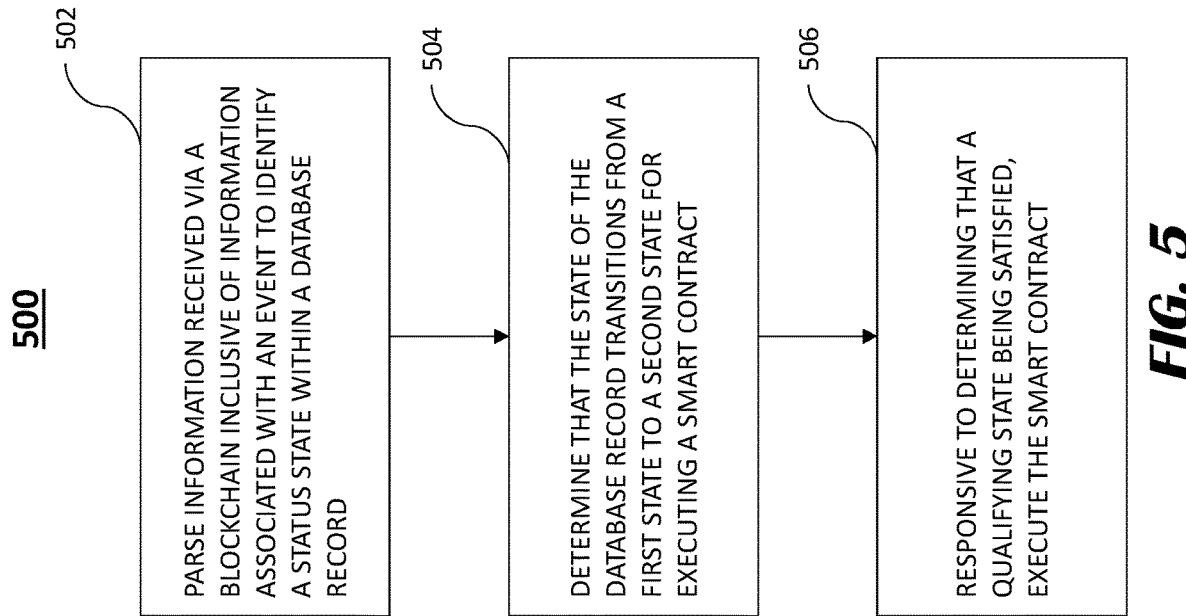
FIG. 5 shows an exemplary method, according to an exemplary embodiment.

FIG. 5 shows an exemplary process 500 for processing a transaction, according an exemplary embodiment. Although the steps of the process 500 may be implemented by multiple computer systems and multiple databases, the following descriptions details, for brevity, a computer system and a database implementing the steps of the process 500.

The process 500 may start at step 502 where, in response to receiving a blockchain via a communications network that includes a database record associated with an event, the computer system may parse the database record to identify a status state within the database record, wherein the status is associated with the event. In parsing the information, the computer system may automatically read the information in the database record to identify whether a status state of a policyholder or other item on which an insurance policy or other contractual obligation has changed. The automatic reading may include the computer system interpreting text, using optical character reading (OCR), reading tags in a structured document, performing image processing, or otherwise, as understood in the art. At step 504, the computer system may determine from the parsed information that the status state of the policyholder has transition from the first state to a second state indicating that the policyholder may satisfy a qualifying state for executing a smart contract identified in the policy. At step 506, responsive to determining that the qualifying state is satisfied by the policyholder, the computer system may execute the smart contract to initiate communications between an insurance company and one or more third parties.

Moreover, in performing the contractual process, the computer system may initiate communications between an insurance company and one or more third party buyer or reinsurer of the insurance policy. The communications may include the status state of the policyholder to cause the third parties to fulfill obligations of the third part(ies) with the insurance company. In one embodiment, the computer system may determine that the status state was entered by a third-party event verifier. The computer system may identify an identifier associated with the third-party event verifier. In determining that the status state of the policyholder, the computer system may determine as to whether the information is indicative of the policyholder has changed from a first health status to a second health status. The computer system may further determine as to whether the information includes an image of a death certificate. If the information includes an image of a death certificate or includes information that is typically included on a death certificate, the computer system may determine that the policyholder changed from being alive to being dead.

In an embodiment, the insurance claim process may be performed by communicating a notice of the status state change from the insurance company to the third part(ies) of the insurance policy. In an embodiment, a determination of a network address of each of the third part(ies) may be made, and the notice may be communicated in substantially real-time to the network address of each of the respective third parties. A smart contract that includes an action to occur between the insurance company and third parties in response to the status state of the insurance policyholder may be executed to change from the first state to the second state. The information may be stored in a distributed ledger in response to receiving the information via the blockchain.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computerized method, comprising:
   in response to receiving a blockchain by a blockchain node via a communications network including information associated with an event, parsing, by a blockchain parsing engine being executed by the blockchain node, the information associated with the event to identify a status state of an item related to the event;

determining, by an event tracking engine being executed by the blockchain node, from the parsed information that the status state of the item has transitioned from a first state to a second state;

responsive to the event tracking engine being executed by the blockchain node determining that a qualifying state is satisfied by the transitioned status state of the item:

identifying, by the blockchain node, based upon the information associated with the event, an electronic certificate associated with the item and stored by the blockchain, wherein the electronic certificate verifies the status state of the item;

parsing, by the blockchain parsing engine being executed by the blockchain node, the electronic certificate to retrieve a unique identifier of a third-party event verifying computing system; and executing, by the blockchain node, a smart code inclusive of initiating communications between a first party and a second party at an address of the second party in response to authenticating the third-party event verifying computing system based on the retrieved unique identifier.

2. The method according to claim 1, further comprising:
storing, in the blockchain, the information associated with a contact, the information including data representative of an address of the contact; and
storing, in a storage unit, the blockchain inclusive of the information associated with the event, status state of the item, and image of the electronic certificate.

3. The method according to claim 1, further comprising determining, by a third-party event verifier engine being executed by the blockchain node, that the status state was generated by a third-party event verifier computing system.

4. The method according to claim 3, wherein determining that the status state was entered by the third-party event verifier computing system includes identifying the unique identifier associated with the third-party event verifier computing system.

5. The method according to claim 1, wherein determining that the status state of the item includes determining that the information is indicative of the item changing state from being alive to being dead.

6. The method according to claim 5, further comprising image matching, by an imaging matching engine, an image of the electronic certificate with one or more locally stored images to authenticate the electronic certificate.

7. The method according to claim 1, further comprising:
communicating a notice of the status state change from the first party to the second party, the notice including the parsed information associated with the event from the blockchain.

8. The method according to claim 1, further comprising automatically updating, by a contact management engine, a table inclusive of the status state of the item, the contact, and the contact address.

9. The method according to claim 1, wherein executing the smart code causes an action to occur between the first party and the second party in response to the status state of the item to change from the first state to the second state.

10. The method according to claim 1, further comprising storing the information in a storage unit in response to receiving the information via the blockchain.

11. A computer system, comprising:
a blockchain node comprising:
    a blockchain engine configured to receive a blockchain that includes information associated with an event;
    a blockchain parsing engine configured to identify a status state of an item related to the event based upon paring the information associated with the event;
    an event tracking engine configured to determine from the parsed information that the status state of the item has transitioned from a first state to a second state; and
wherein responsive to the event tracking engine determining that a qualifying state is satisfied by the transitioned status state of the item:
    the blockchain node is configured to identify, based upon the information associated with the event, an electronic certificate associated with the item and stored by the blockchain, wherein the electronic certificate verifies the status state of the item,
    the blockchain parsing engine is further configured to parse the electronic certificate to retrieve a unique identifier of a third-party event verifying computing system,
    the blockchain node is further configured to execute a smart code inclusive of initiating communications between a first party and a second party at an address of the second party in response to authenticating the third-party event verifying computing system based on the retrieved unique identifier.

12. The system according to claim 11, wherein the blockchain node is further configured to:
store, in the blockchain, the information associated with a contact, the information including data representative of an address of the contact; and
store, in a storage unit, the blockchain inclusive of the information associated with the event, status state of the item, and image of the certificate.

13. The system according to claim 11, wherein the blockchain node is further configured to determine, by a third-party event verifier engine being executed by the blockchain node, that the status state was generated by a third-party event verifier computing system.

14. The system according to claim 13, wherein determining that the status state was generated by a third-party event verifier includes identifying the unique identifier associated with the third-party event verifier computing system.

15. The system according to claim 11, wherein determining that the status state of the item includes determining that the information is indicative of the item changing state from being alive to being dead.

16. The system according to claim 15, wherein the blockchain node further comprises an imaging matching engine configured to image match an image of the electronic certificate with one or more locally stored images to authenticate the electronic certificate.

17. The system according to claim 11, wherein the blockchain node is further configured to communicate a notice of the status state change from the first party to the second party, the notice including the parsed information associated with the event from the blockchain.

18. The system according to claim 11, further comprising a contact management engine configured to automatically update a table inclusive of the status state of the item, the contact, and the contact address.

19. The system according to claim 11, wherein executing the smart code causes an action to occur between the first party and the second party in response to the status state of the item to change from the first state to the second state.

20. The system according to claim 11, wherein the blockchain node is further configured to store the information in a storage unit in response to receiving the information via the blockchain.

* * * * *